(12) United States Patent
Hagari et al.

(10) Patent No.: US 10,197,036 B2
(45) Date of Patent: Feb. 5, 2019

(54) INTERNAL COMBUSTION ENGINE CONTROL APPARATUS

(75) Inventors: Hideki Hagari, Chiyoda-ku (JP); Yuhei Matsushima, Chiyoda-ku (JP); Keitaro Ezumi, Aki-gun (JP); Tomokuni Kusunoki, Aki-gun (JP)

(73) Assignees: Mitsubishi Electric Corporation, Chiyoda-ku, Tokyo (JP); MAZDA MOTOR CORPORATION, Hiroshima (JP)

( * ) Notice: Subject to any disclaimer, the term of this patent is extended or adjusted under 35 U.S.C. 154(b) by 1996 days.

(21) Appl. No.: 13/290,437

(22) Filed: Nov. 7, 2011

(65) Prior Publication Data

US 2012/0192833 A1    Aug. 2, 2012

(30) Foreign Application Priority Data

Feb. 1, 2011 (JP) .................................. 2011-19685

(51) Int. Cl.
| | |
|---|---|
| B60T 7/12 | (2006.01) |
| F02P 5/152 | (2006.01) |
| F02D 35/02 | (2006.01) |

(52) U.S. Cl.
CPC ............ F02P 5/152 (2013.01); F02D 35/027 (2013.01); Y02T 10/46 (2013.01)

(58) Field of Classification Search
CPC .... F01N 3/0842; F01N 3/0814; F01N 3/0807; F01N 13/009; F02D 41/0275;
(Continued)

(56) References Cited

U.S. PATENT DOCUMENTS 4,711,212 A * 12/1987 Haraguchi et al. ...... 123/406.38
5,190,011 A    3/1993 Hashimoto et al.
(Continued)

FOREIGN PATENT DOCUMENTS

| CN | 101187341 A | 5/2008 |
|---|---|---|
| DE | 41 32 832 A1 | 4/1992 |

(Continued)

OTHER PUBLICATIONS

Chinese Office Action dated Feb. 21, 2014, Patent Application No. 2011104431154.
(Continued)

*Primary Examiner* — Hai Huynh
*Assistant Examiner* — Gonzalo Laguarda
(74) *Attorney, Agent, or Firm* — Sughrue Mion, PLLC; Richard C. Turner

(57) ABSTRACT

An operation status value detection unit detects two or more operation status values indicating an operation status of an internal combustion engine. A filtering processing unit applies filtering processing to the detected operation status values, and an operation status value difference calculation unit calculates the difference between the filter-processed operation status value and the corresponding non-filter-processed operation status value so as to calculate two or more operation status value differences. An operation status value difference normalization unit normalizes the two or more operation status value differences, based on predetermined reference values for the two or more operation status values, so as to calculate two or more normalized operation status value differences; and a transient correction unit corrects a control amount for controlling output of the internal combustion engine, based thereon, when the engine is in a transient-operation mode.

20 Claims, 9 Drawing Sheets

(58) Field of Classification Search
CPC ...... F02D 2200/0811; F02D 2041/1432; F02P 5/152; Y02T 10/46
USPC ..... 60/274, 285, 276, 286; 123/319, 406.38, 123/434, 435; 73/35.09
See application file for complete search history.

(56) References Cited

U.S. PATENT DOCUMENTS

| | | | |
|---|---|---|---|
| 6,119,063 A | | 9/2000 | Hieb et al. |
| 6,708,483 B1 * | | 3/2004 | Robichaux et al. ............ 60/286 |
| 7,530,347 B2 * | | 5/2009 | Asano et al. ................. 123/434 |
| 7,942,040 B2 * | | 5/2011 | Kaneko et al. ............ 73/114.07 |
| 2004/0193360 A1 | | 9/2004 | Ishikawa et al. |
| 2014/0041439 A1 * | | 2/2014 | Matsushima ................ 73/35.09 |

FOREIGN PATENT DOCUMENTS

| | | | |
|---|---|---|---|
| DE | 10 2004 013 613 A1 | 10/2004 |
| JP | 2-53622 B2 | 11/1990 |
| JP | 06-249017 A | 9/1994 |
| JP | 2542116 B2 | 10/1996 |
| JP | 11-264330 A | 9/1999 |
| JP | 3325067 B2 | 9/2002 |

OTHER PUBLICATIONS

Communication dated Oct. 8, 2014 from The Chinese Patent Office in counterpart Chinese Patent Application No. 20111443115.4.
Communication dated Nov. 8, 2017 from the German Patent and Trademark Office in counterpart application No. 10 2011 087 303.1.

* cited by examiner (1) WHEN NO KNOCK EXISTS (2) WHEN KNOCK EXISTS

INTERNAL COMBUSTION ENGINE CONTROL APPARATUS

BACKGROUND OF THE INVENTION

Field of the Invention

The present invention relates to an internal combustion engine control apparatus and particularly to an internal combustion engine control apparatus that makes it possible to determine whether an internal combustion engine is in a steady-operation mode or in a transient-operation mode and that can perform appropriate control even when the internal combustion engine is in the transient-operation mode.

Description of the Related Art

To date, it has been known that the operation modes of an internal combustion engine include a steady-operation mode and a transient-operation mode; by changing a control method or a control constant for the internal combustion engine in accordance with the operation mode, control suitable for the operation mode is performed. Here, the steady-operation mode of an internal combustion engine denotes a case where the internal combustion engine is operated with an approximately constant rotation speed and approximately constant output. In the steady-operation mode, by setting to be large the filter coefficient for filtering processing of the inputs from sensors, for example, an air flow sensor, an intake pipe inner pressure sensor, a knock sensor, and the like, i.e., by setting the cut-off frequency to be low, fluctuation in the intake amount measurement is reduced so that fluctuation in the control amounts of ignition timing control and fuel injection control is suppressed, and by reducing fluctuation in the background level (referred to as a BGL, hereinafter), which is the average value of the vibration level of a knock sensor signal in knock control, fluctuation in the knock determination threshold value level is suppressed. Accordingly, there is obtained a stable operation mode with less torque fluctuation; in the case where a knock occurs, control is performed in such a way that the knock is accurately detected, and retarding correction is applied to the ignition timing so that the knock is suppressed.

The transient-operation mode of an internal combustion engine denotes a case where the internal combustion engine is operated in a transient mode where the rotation speed and the output of the internal combustion engine are increasing or decreasing. In the case where the transient-operation mode is detected, by setting to be small the foregoing filter coefficient of filtering processing of inputs from sensors, i.e., by setting the cut-off frequency to be high, the response speed of the intake amount measurement is raised so that there is raised the tracking capability for the control amounts in the ignition timing control and the fuel injection control and hence deterioration in the exhaust gas is suppressed. In the case of rapid acceleration or the like, there exists a case where in fuel injection control, control is performed in such a way as to create the feeling of acceleration, by raising the torque through transient amount-increasing correction or a case where even in ignition-timing correction, several-stroke transient retard correction is implemented so as to suppress a transient knock, and then by raising the response speed of the BGL in knock control, the threshold value level is controlled with a high tracking capability so that control is performed in such a way as to suppress torque from being decreased by erroneous retarding correction.

As an example of method of performing switching between control in the steady-operation mode and control in the transient-operation mode, Patent Document 1 proposes a method in which in the case of transient-operation mode with knock control, a knock determination threshold value is corrected so that there is prevented an erroneous knock retarding correction due to rapid change in the level of a knock sensor signal. Patent Document 2 proposes a method in which an acceleration/deceleration mode value is calculated from the calculation value obtained by applying filtering to a loaded-mode value so that the fuel injection amount is corrected. Furthermore, Patent Document 3 proposes a method in which based on the rotation speed of an internal combustion engine, the throttle opening degree, and the displacement angle in the intake valve timing, there is calculated an estimated value for a change, in inner-cylinder contained air amount, caused by a change of the intake valve timing in the transient-operation mode, so that the inner-cylinder contained air amount is accurately calculated from the calculation value obtained by applying filtering to the foregoing estimated value.

Patent Document 4 discloses the fact that a load information value such as filling efficiency rises in such a manner as a first-order lag response, as the throttle opening degree changes (described later). Patent Document 5 discloses that when an internal combustion engine is operated in the transient-operation mode, filter coefficients are switched (described later).

PRIOR ART REFERENCE

Patent Document

[Patent Document 1] Japanese Patent No. 3325067
[Patent Document 2] Japanese Patent Application Laid-Open No. H6-249017
[Patent Document 3] Japanese Patent Application Laid-Open No. H11-264330
[Patent Document 4] Japanese Examined Patent Publication (Kokoku) No. H2-53622
[Patent Document 5] Japanese Patent No. 2542116

The method, disclosed in Patent Document 1, in which a conventional apparatus determines the transient-operation mode is implemented by detecting a load change in the throttle opening degree or the like. Specifically, the method is configured in such a way that based on the amount of change per unit time in the throttle opening degree or the like, rapid acceleration, intermediate acceleration, or slow acceleration is determined, and, furthermore, a transient correction is implemented in a predetermined time period after the determination of the transient-operation mode and after the time period elapses, the amount of the transient correction is gradually reduced so that a level difference is prevented from being produced in the correction amount after the completion of the acceleration. However, in the case of this method, there are required the adequacy of the degree determination in which the degree of acceleration/deceleration such as rapid acceleration, intermediate acceleration, or slow acceleration is determined based on the amount of change per unit time in the throttle opening degree or the like, the adequacy of the period in which the transient correction is implemented, and the adequacy of the speed at which the amount of the transient correction is gradually reduced. Moreover, there has been a problem that in the case where in order to accurately implement the transient correction, there are implemented not only the transient-operation mode determination based on the throttle opening degree but also the transient-operation mode determination based on the amount of change per unit time in the air-intake amount or in the rotation speed of the internal combustion engine, further more adequacies are required.

In contrast, in the method, disclosed in Patent Document 2, in which a conventional apparatus calculates an acceleration/deceleration mode value, the difference between a first annealed value calculated by applying filtering processing to the load information value and a second annealed value calculated by further applying filtering processing to the first annealed value is utilized as the acceleration/deceleration mode value. However, because in this method, the transient-operation mode is determined by utilizing the load information obtained through 2-step filtering processing, the detection of the transient-operation mode may be delayed. In other words, it is understood that the transient-operation mode of an internal combustion engine begins with a change in the throttle opening degree, a change in the intake amount (including load information values such as an intake manifold pressure and a filling efficiency) then varies the torque of the internal combustion engine and hence the rotation speed of the internal combustion engine changes, and the intake amount and the rotation speed of the internal combustion engine stabilize, so that the internal combustion engine comes into the steady-operation mode. Accordingly, there has been a problem that the transient mode determination only with load information delays the detection of the transient-operation mode that begins with a change in the throttle opening degree.

Furthermore, because in a conventional apparatus disclosed in Patent Document 3, based on the rotation speed of an internal combustion engine, the throttle opening degree, and the displacement angle in the intake valve timing, there is calculated an estimated value for a change, in inner-cylinder contained air amount, caused by a change of the intake valve timing in the transient-operation mode, it is conceivable that the delay of transient mode detection, which is the problem of the conventional apparatus disclosed in the foregoing Patent Document 2, is small; however, because a change in the inner-cylinder contained air amount is estimated by use of a plurality of information items, many control maps are utilized; thus, there has been a problem that adequacy machine-hours become massive.

SUMMARY OF THE INVENTION

The present invention has been implemented in order to solve the foregoing problems in the conventional apparatuses; the objective thereof is to provide an internal combustion engine control apparatus that can detect the transient-operation mode without delay and can realize with few machine-hours the compliance of the transient correction amounts including an acceleration/deceleration degree, a transient correction period, a transient correction amount reducing speed, and the like.

An internal combustion engine control apparatus according to the present invention is a control apparatus for controlling output of an internal combustion engine; the internal combustion engine control apparatus is characterized by including an operation status value detection unit that detects two or more operation status values indicating an operation status of the internal combustion engine; a filtering processing unit that applies filtering processing to the detected two or more operation status values; an operation status value difference calculation unit that calculates the difference between the filter-processed operation status value and the corresponding non-filter-processed operation status value so as to calculate two or more operation status value differences; an operation status value difference normalization unit that normalizes the two or more operation status value differences, based on predetermined reference values for the two or more operation status values, so as to calculate two or more normalized operation status value differences; and a transient correction unit that corrects a control amount for controlling output of the internal combustion engine, based on the two or more normalized operation status value differences, when the internal combustion engine is in a transient-operation mode.

An internal combustion engine control apparatus according to the present invention includes an operation status value detection unit that detects two or more operation status values indicating an operation status of an internal combustion engine; a filtering processing unit that applies filtering processing to the detected two or more operation status values; an operation status value difference calculation unit that calculates the difference between the filter-processed operation status value and the corresponding non-filter-processed operation status value so as to calculate two or more operation status value differences; an operation status value difference normalization unit that normalizes the two or more operation status value differences, based on predetermined reference values for the two or more operation status values, so as to calculate two or more normalized operation status value differences; and a transient correction unit that corrects a control amount for controlling output of the internal combustion engine, based on the two or more normalized operation status value differences, when the internal combustion engine is in a transient-operation mode. As a result, the internal combustion engine control apparatus according to the present invention can detect the transient-operation mode without delay, by utilizing two or more operation status values; thus, there can be demonstrated an excellent effect that transient correction amounts including an acceleration/deceleration degree, a transient correction period, a transient correction amount reducing speed, and the like can be made adequate with few machine-hours.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
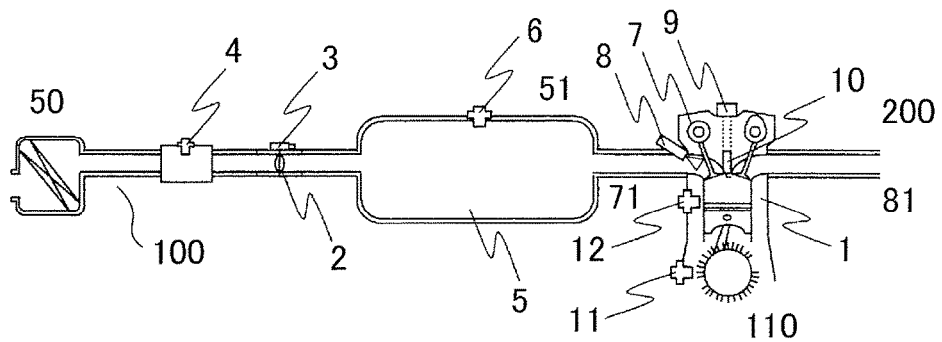
FIG. 1 is a configuration diagram schematically illustrating an internal combustion engine to which an internal combustion engine control apparatus according to Embodiment 1 of the present invention is applied.

Hereinafter, an internal combustion engine control apparatus according to Embodiment 1 of the present invention will be explained in detail with reference to the drawings. FIG. 1 is a configuration diagram schematically illustrating an internal combustion engine to which an internal combustion engine control apparatus according to Embodiment 1 of the present invention is applied. In general, an internal combustion engine for a vehicle such as an automobile is provided with a plurality of cylinders and a plurality of pistons; however, in FIG. 1, for the convenience of explanation, only a single cylinder and only a single piston are illustrated.

In FIG. 1, an air filter 50 is provided at the upstream side of an intake system 100 of an internal combustion engine (referred to as an engine, hereinafter) 1, and at the downstream side of the intake system 100, there is provided a surge tank 5 in which air taken in through the air filter 50 is stored. The surge tank 5 is coupled with a plurality of cylinders of the engine 1 through the intermediary of an intake manifold 51.

The opening degree of an electronically-controlled throttle valve (referred to simply as a throttle valve, hereinafter) 2 provided at the upstream side of the surge tank 5 is electronically controlled so that the intake air flow rate of the intake system 100 is adjusted. An air flow sensor 4 provided at the upstream side of the throttle valve 2 measures the intake air flow rate in the intake system 100 and outputs an intake air flow rate signal corresponding to the measurement.

A throttle opening degree sensor 3 measures the opening degree of the throttle valve 2 and outputs a throttle valve opening degree signal corresponding to the measurement. Instead of the electronic throttle valve 2, there may be utilized a mechanical throttle valve directly connected with an unillustrated accelerator pedal through a wire.

An intake manifold pressure sensor 6 provided in the surge tank 5 measures the intake air pressure inside the surge tank 5, i.e., the intake air pressure inside the intake manifold 51 and outputs an intake manifold pressure signal corresponding to the measurement. In Embodiment 1,both the air flow sensor 4 and the intake manifold pressure sensor 6 are provided; however, it may be allowed that either one of them is provided.

A variable intake valve mechanism 7 variably controls the opening/closing timing of an intake valve 71 provided at the downstream intake port of the surge tank 5. An injector 8 that injects fuel is provided at the intake port. It may be allowed that the injector 8 is provided inside the cylinder of the engine 1 in such a way that the injector 8 can inject directly into the cylinder.

In the cylinder head of the engine 1, there are provided an ignition coil 9 for igniting a fuel-air mixture inside the cylinder and an ignition plug 10 that is formed integrally with the ignition coil 9. On the crankshaft of the engine 1, there is provided a plate 110 having on its circumference a plurality of edges arranged in such a way as to be spaced a predetermined distance apart from one another. A crank angle sensor 11 is provided in such a way as to face the edges of the plate 110, detects the edges of the plate 110 that rotates along with the crankshaft, and outputs a pulse signal synchronized with the respective distances between the edges. A knock sensor 12 provided in the engine 1 outputs a vibration waveform signal based on the vibration of the engine 1.

An exhaust valve 81 provided at the exhaust port of the cylinder is opened so that exhaust is discharged from the cylinder to an exhaust system 200. A catalytic device (unillustrated) for purifying exhaust is provided at the downstream side of the exhaust system 200.

Figure 2:
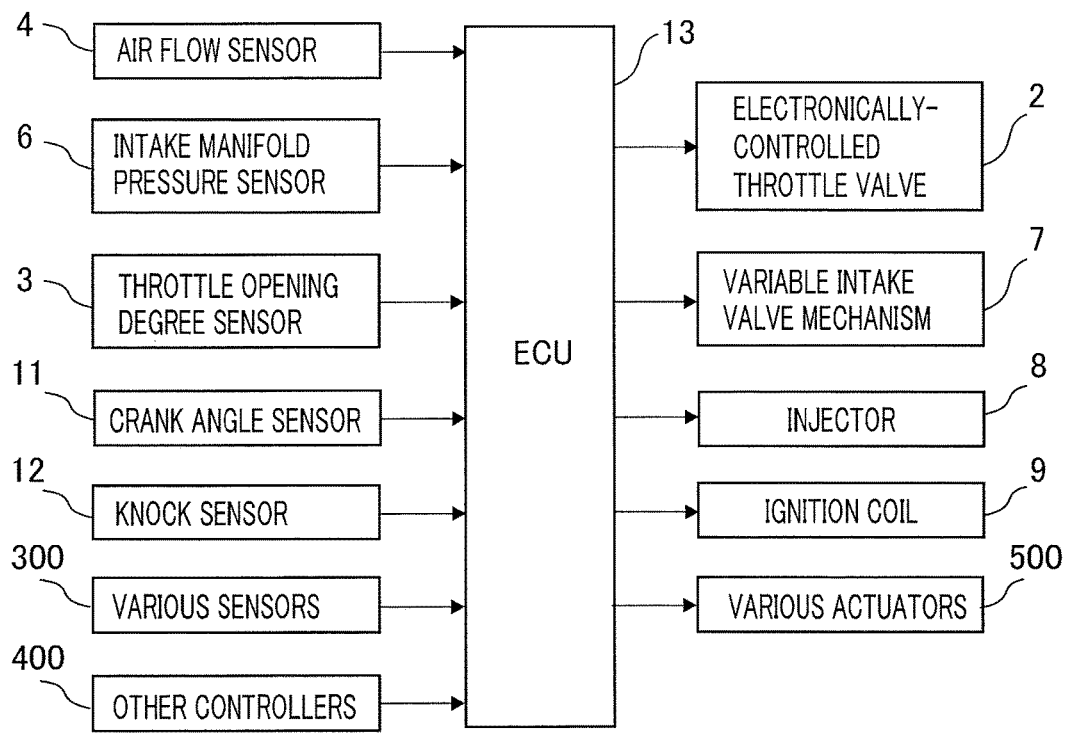
FIG. 2 is a block diagram illustrating the configuration of an internal combustion engine control apparatus according to Embodiment 1 of the present invention.

FIG. 2 is a block diagram illustrating the configuration of an internal combustion engine control apparatus according to Embodiment 1 of the present invention. In FIG. 2, an electronic control unit (referred to as an ECU, hereinafter) 13 of the engine 1 is formed of a calculation device such as a microcomputer; the intake air flow rate signal outputted from the air flow sensor 4, the intake manifold pressure signal outputted from the intake manifold pressure sensor 6, the throttle valve opening degree signal outputted from the throttle opening degree sensor 3, the pulse signal that is outputted from the crank angle sensor 11 and is synchronized with the respective distances between the edges of the plate 110, and the vibration waveform signal that is based on the vibration of the engine 1 and outputted from the knock sensor 12 are inputted to the ECU 13.

From unillustrated various kinds of sensors 300, respective signals, other than the foregoing signals, that correspond to the measurements are inputted to the ECU 13; furthermore, for example, signals from other controllers 400 such as an automatic transmission control system, a brake control system, and a traction control system are also inputted to the ECU 13.

Based on the accelerator opening degree, the operation status of the engine 1, and the like, the ECU 13 calculates a target throttle opening degree and controls the opening degree of the throttle valve 2, based on the calculated target throttle opening degree. The ECU 13 variably controls the variable intake valve mechanism 7 in accordance with the operation status of the engine 1 so as to control the opening/closing timing of the intake valve 71, controls the fuel injection amount by driving the injector 8 in such a way as to achieve a target air-fuel ratio, and, furthermore, controls the ignition timing by controlling the energization of the ignition coil 9 in such a way as to achieve a target ignition timing.

When detecting the knock of the engine 1 in such a manner as described later, the ECU 13 performs control in which by setting the target ignition timing to the angle delay side (retarding side), it suppresses the knock from occurring. The ECU 13 calculates instruction values for controlling the various kinds of actuators 500 other than the foregoing devices and controls the various kinds of actuators 500, based on the instruction values.

Figure 3:
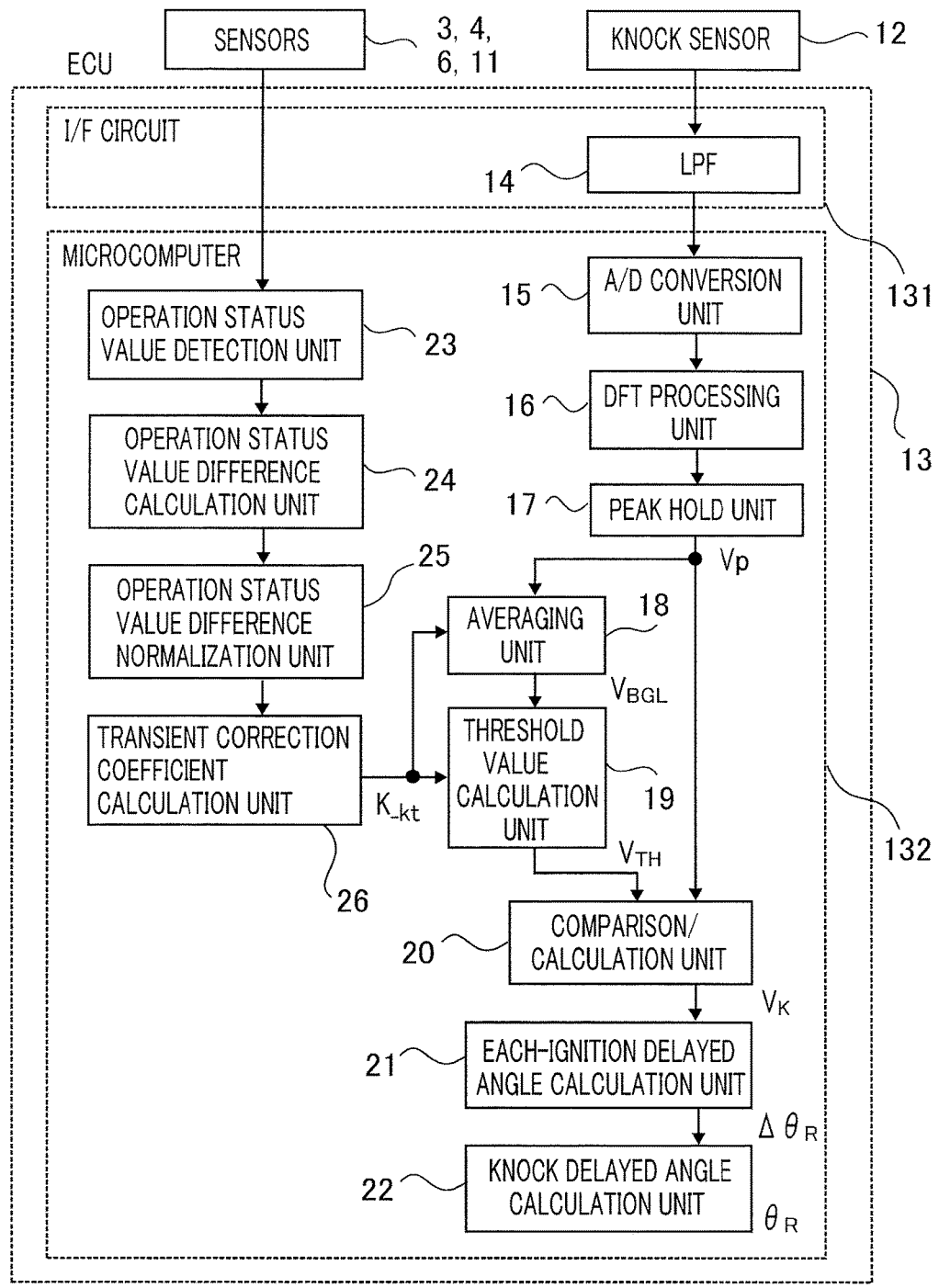
FIG. 3 is a block diagram illustrating the configuration of a knock control unit in an internal combustion engine control apparatus according to Embodiment 1 of the present invention.

Next, knock control, which is performed in the ECU 13, will be explained. FIG. 3 is a block diagram illustrating the configuration of a knock control unit in an engine control apparatus according to Embodiment 1 of the present invention. In FIG. 3, the ECU 13 is provided with an IF circuit 131 for knock control and a microcomputer 132. The IF circuit 131 is provided with a lowpass filter (referred to as an LPF, hereinafter) 14 for eliminating the high-frequency components of the output signal from the knock sensor 12.

The whole microcomputer 132 is configured with an A/D converter for converting an analogue signal into a digital signal, a ROM region in which control programs and control constants are stored, a RAM region in which variables at a time when the programs are implemented are stored, and the like; however, in FIG. 3, the configuration related to the knock control unit is mainly illustrated.

The microcomputer 132 is provided with an A/D converter 15, a DFT processing unit 16, a peak hold unit 17, an averaging processing unit 18, a threshold value calculation unit 19, a comparison/calculation unit 20, an each-ignition delayed angle calculation unit 21, and a knock correction amount calculation unit 22. The microcomputer 132 is also provided with an operation status value detection unit 23, which serves as an operation status value detection device, to which the output signals from the throttle opening degree sensor 3, the air flow sensor 4, the intake manifold pressure sensor 6, and the crank angle sensor 11 are inputted by way of the IF circuit 131; an operation status value difference calculation unit 24, which serves as an operation status value difference calculation device; an operation status value difference normalization unit 25, which serves as an operation status value difference normalization device; and a transient correction coefficient calculation unit 26, which serves as a transient correction device.

The A/D converter 15 of the microcomputer 132 applies A/D conversion every specific time period, for example, 10 [μs] or 20 [μs] to a vibration waveform signal inputted thereto from the knock sensor 12 by way of the LPF 14. In order to make the A/D converter 15 take in all vibration components, the LPF 14 includes a function in which bias of, for example, 2.5[V] is applied to the vibration waveform signal so that the center of the vibration components is fixed to 2.5[V]; furthermore, the LPF 14 also includes a gain conversion function in which in the case where vibration components are small, the vibration components are amplified with respect to 2.5[V], and in the case where vibration components are large, the vibration components are attenuated with respect to 2.5[V] so that vibration components fall into the range from 0[V] to 5[V].

The A/D converter 15 may constantly apply A/D conversion to an analogue signal from the LPF 14 and may send, to the DFT processing unit 16, only the data obtained during a knock detection time period X set in a time period during which a knock occurs in the engine 1, for example, a time period from the top death center (referred to as TDC, hereinafter) of a piston to 50° CA after the top death center (referred to as ATDC, hereinafter); alternatively, the A/D converter 15 may implement A/D conversion only during the knock detection time period set from TDC to ATDC50° CA and may send the data to the units after and including the DFT processing unit 16.

Figure 4:
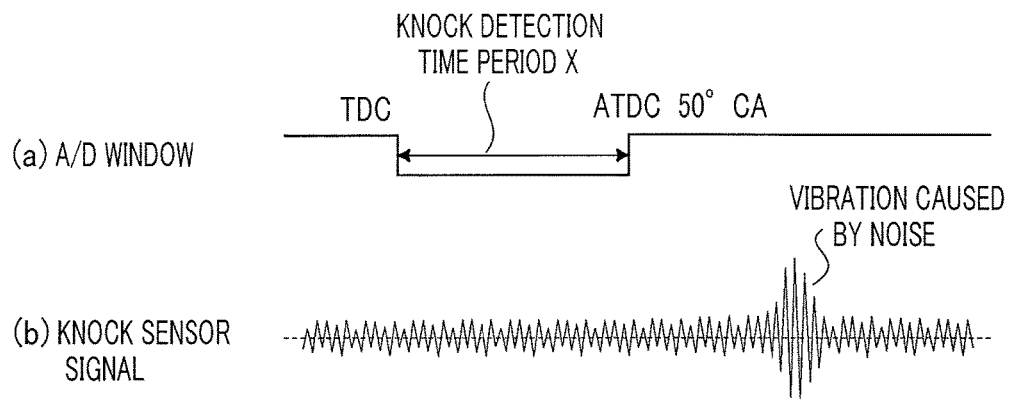
FIG. 4 is a set of explanatory charts schematically representing the vibration level of an internal combustion engine.
Figure 4:
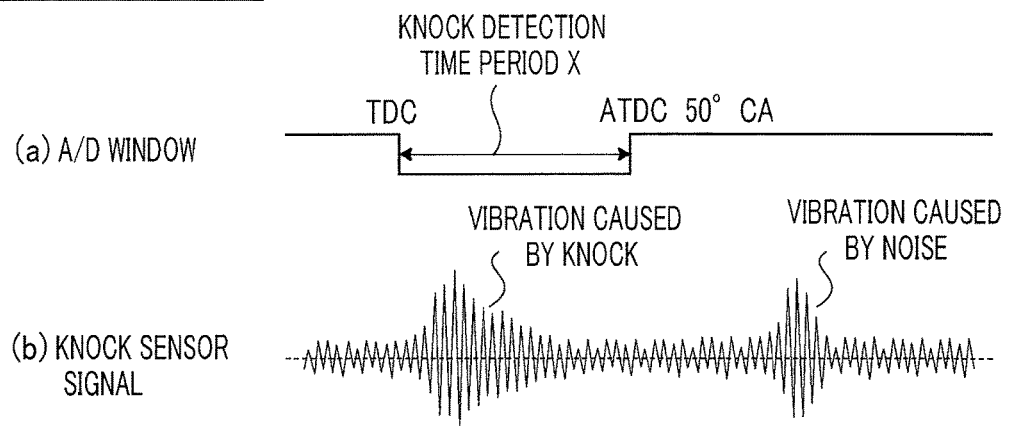

Next, the foregoing knock detection time period X will be explained. FIG. 4 is a set of explanatory charts schematically representing the vibration level of an internal combustion engine; FIG. 4(1) represents a case where no knock occurs, and FIG. 4(2) represents a case where a knock occurs; (a) and (A) each represent A/D windows, and (b) and (B) each represent the waveforms of knock sensor signals. In the case (1) where no knock occurs, during the knock detection time period, the vibration components of a knock sensor signal (b) are small, whereby there exists no abnormal vibration caused by a knock. However, in the case (2) where a knock occurs, during the knock detection time period, the vibration components of a knock sensor signal (B) are large, whereby there exists an abnormal vibration caused by a knock. In addition, there exists a vibration caused by noise not only in the case (1) but also in the case (2). As described above, as the knock detection time period, there is set a time period in which the amplitudes of vibration components changes depending on whether or not there exists a knock.

Again, in FIG. 3, in the DFT processing unit 16, time-to-frequency analysis through digital-signal processing is applied to a knock sensor signal that has passed through the A/D window of the A/D converter 15. As this digital-signal processing, processing, which is referred to, for example, as discrete Fourier transformation (DFT) or short time Fourier transformation (STFT), is implemented, so that the spectral lines of different knock inherent frequency components are calculated. In the digital-signal processing, the knock inherent frequency components may be extracted by use of an IIR (infinite impulse response) filter or a FIR (finite impulse response) filter. The calculation in the DFT processing unit 16 may be implemented while A/D conversion is implemented or may collectively be implemented through interruption processing synchronized with the rotation of the engine.

The peak hold unit 17 calculates the peak hold value VP(n) of a spectral line calculated in the DFT processing unit 16. The processing in the units after and including the peak hold unit 17 is implemented in interruption processing synchronized with the rotation of the engine. By use of the equation (1) below, the averaging unit 18, as an averaging device, applies filtering processing to the peak hold value VP(n), calculated every stroke of the engine by the peak hold unit 17, so as to calculate the filtered value VBGL(n). The filtered value VBGL(n) corresponds to the BGL, which is the average value of vibration levels of the peak hold values VP(n).

$$VBGL(n)=K1(n)\times VBGL(n-1)+(1-K1(n))\times VP(n) \quad (1)$$

VBGL(n): filtered value, VP(n): peak hold value
K1 (n): 1st filter coefficient, n: the number of strokes Subsequently, the threshold value calculation unit 19, as a threshold value calculation device, calculates a knock determination threshold value. At first, according to the equations (2) and (3) below, the variance and the standard deviation are calculated. The threshold value calculation unit 19 includes a standard deviation calculation device.

$$VV(n)=K2(n)\times VV(n-1)+(1-K2(n))\times(VBGL(n)-VP(n)) \quad (2)$$

$$VSGM(n)=sqrt(VV(n)) \quad (3)$$

VSGM(n): standard deviation, VV(n): variance
K2 (n): 2nd filter coefficient, sqrt( ): square root calculation function Subsequently, the knock determination threshold value is calculated according to the equation (4) below.

$$VTH(n)=VBGL(n)+Kth\times VSGM(n) \quad (4)$$

VTH(n): knock determination threshold value, Kth: threshold value calculation coefficient Here, a first filter coefficient K1 (n) and a second filter coefficient K2 (n) utilized in the averaging unit 18 and the threshold value calculation unit 19 are corrected based on a transient correction coefficient K_kt(n); the method of calculating the transient correction coefficient K_kt(n) and the method of correcting the first filter coefficient K1 (n) and the second filter coefficient K2 (n) based on the transient correction coefficient K_kt(n) will be described later.

By comparing a peak hold value VP(n) calculated by the peak hold unit 17 with a knock determination threshold value VTH(n) calculated by the threshold value calculation unit 19, the comparison/calculation unit 20 determines based on the equation (5) below whether or not a knock has occurred, and outputs a knock intensity signal corresponding to the intensity of a knock. The comparison/calculation unit 20 forms a knock detection unit.

$$VK(n)=\max\{(VP(n)-VTH(n))/VTH(n), 0\} \quad (5)$$

VK(n): knock intensity (when VK(n)>0, determined that there exists a knock.)

Based on the result of knock determination by the comparison/calculation unit 20, the each-ignition delayed angle calculation unit 21 calculates, according to the equation (6) below, the delayed angle corresponding to the knock intensity for each ignition.

$$\Delta\theta R(n)=\max\{-VK(n)\times Kg(n), \theta\min\} \quad (6)$$

$\Delta\theta R(n)$: each-ignition delayed angle, Kg(n): delayed angle reflected coefficient, $\theta\min$: maximum delayed angle The knock delayed angle calculation unit 22 accumulates the each-ignition delayed angle $\Delta\theta R(n)$ calculated by the each-ignition delayed angle calculation unit 21 so as to calculate the knock correction amount at an ignition timing; however, when there exists no knock, the knock correction amount is restored in an angle advancing manner. The knock correction amount is calculated according to the equation (7) below.

$$\theta R(n)=\min\{\theta R(n-1)+\Delta\theta R(n)+Ka, \theta\max\} \quad (7)$$

$\theta R(n)$: knock correction amount, Ka(n): advanced angle restoration coefficient, $\theta\max$: maximum advanced angle By use of the knock correction amount $\theta R$ calculated in such a way as describe above, the final ignition timing is calculated according to the equation (8) below.

$$\theta IG=\theta B+\theta R(n) \quad (8)$$

$\theta IG$: final ignition timing, $\theta B$: basic ignition timing

The each-ignition delayed angle calculation unit 21 and the knock delayed angle calculation unit 22 configure a knock control unit.

Heretofore, there has been explained a processing method in which in the block from the DFT processing unit 16 to the knock delayed angle calculation unit 22, knock detection utilizing the result of frequency analysis is implemented through digital signal processing and ignition-timing angle is delayed so that knock control for suppressing a knock is achieved.

Next, the method of calculating the foregoing transient correction coefficient K_kt(n) will be explained. In FIG. 3, based on signals from a plurality of sensors such as the throttle opening degree sensor 3, the air flow sensor 4, the intake manifold pressure sensor 6, and the crank angle sensor 11, the operation status value detection unit 23 detects a plurality of operation status values. The operation status value difference calculation unit 24 calculates respective operation status value differences for the plurality of operation status detection values detected by the operation status value detection unit 23. Next, the operation status value difference normalization unit 25 normalizes the operation status value difference calculated by the operation status value difference calculation unit 24. The transient correction coefficient calculation unit 26 calculates the transient correction coefficient K_kt(n) by utilizing the normalized value of the operation status value difference calculated by the operation status value difference normalization unit 25.

Next, the method of calculating the transient correction coefficient K_kt(n) will be explained more in detail below.

Figure 5:
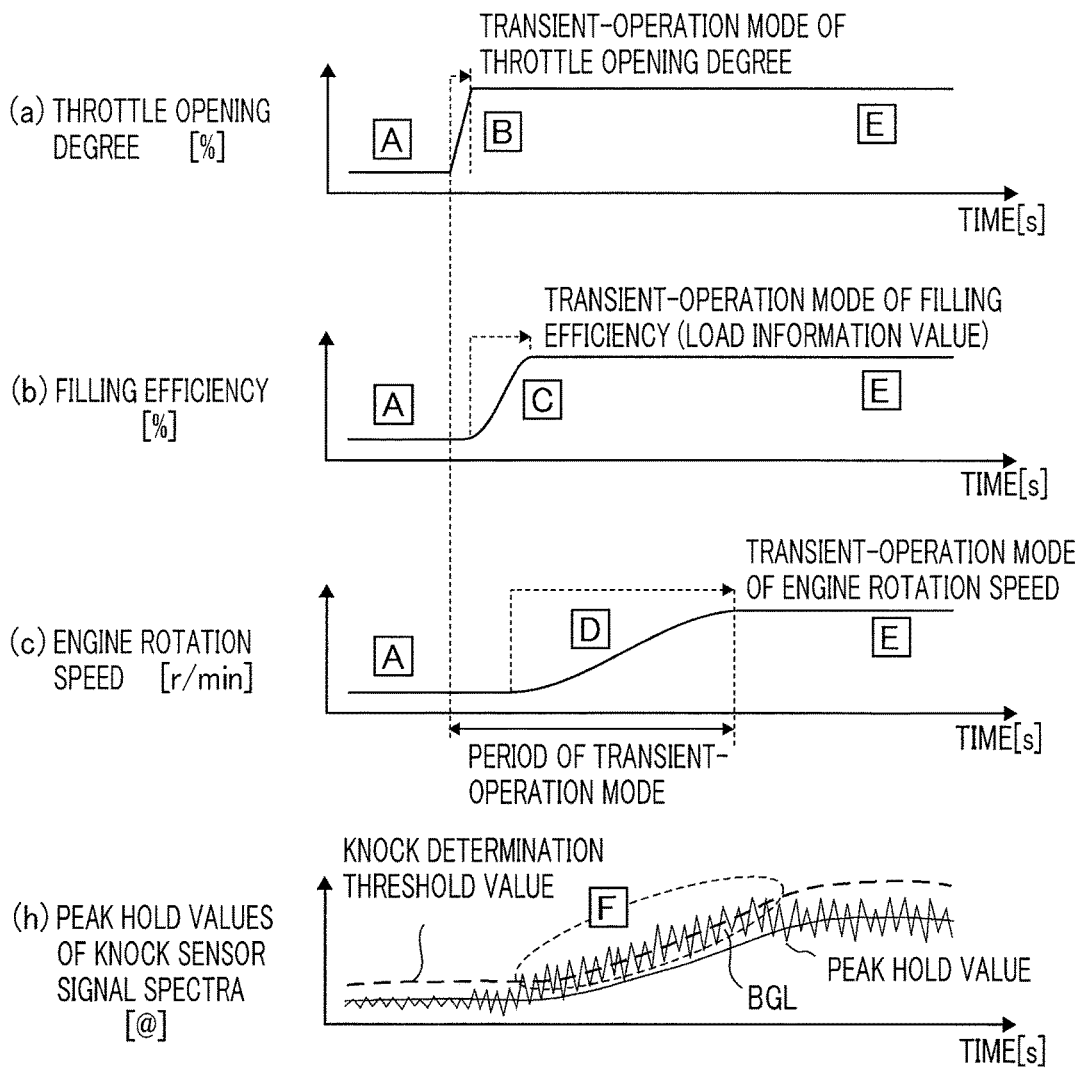
FIG. 5 is a timing chart schematically representing an example of transient-operation mode of an internal combustion engine.

Firstly, an example of transient-operation mode of the engine 1 will be explained. FIG. 5 is a timing chart schematically representing an example of transient-operation mode of an engine. The timing chart in FIG. 5 represents an exemplar case where the throttle opens in a step manner from the steady-operation mode; (a), (b), (c), and (d) represent the throttle opening degree, the filling efficiency, the engine rotation speed, and the peak hold values of the spectra of the knock sensor signal, respectively.

In FIG. 5, the steady-operation mode with a predetermined throttle opening degree is a mode where the amount of air that passes through the throttle valve 2, the engine rotation speed, and the engine load torque (for example, in the case where the vehicle is traveling, the engine load torque denotes traveling load torque, and in the case where the vehicle is in the idling mode, it may be mechanical loss torque of the engine) balance with one another (this particular mode is indicated by "A" in (a) through (c) in FIG. 5). When the throttle opening degree changes toward the "open" side (indicated by "B" in (a) of FIG. 5), the amount of air that passes through the throttle valve 2 (this particular amount is approximately the same as the amount of air detected by the air flow sensor 4) increases, whereby the pressure inside the surge tank 5 rises in such a manner as a first-order lag response.

Because the engine 1 takes in the air in the surge tank 5 through the intermediary of the intake valve 71, the filling efficiency also rises approximately in synchronization with the pressure inside the surge tank 5. In such a manner as described above, the filling efficiency rises in such a manner as a first-order lag response to a change in the amount of air that passes through the throttle (indicated by "C" in (b) of FIG. 5). Subsequently, when the filling efficiency rises, the output torque of the engine 1 also rises; thus, the engine rotation speed start to rise, as well (indicated by "D" in (c) of FIG. 5). After that, when the amount of air that passes through the throttle valve 2, the engine rotation speed, and the engine load torque balance with one another, the vehicle again comes into the steady-operation mode (indicated by "E" in (a) through (c) of FIG. 5). In the case where the throttle opens in a step manner from the steady-operation mode, the transient-operation mode is represented by the foregoing behavior.

In general, as the load information value, the filling efficiency, the cylinder intake air amount, the pressure inside the surge tank (intake manifold pressure), or the like is utilized; however, the following explanation will be made by utilizing the filling efficiency, as the load information value. It is well known, for example, from the foregoing Patent Document 4 or the like, that the load information value such as the filling efficiency rises in such a manner as a first-order lag response, as the throttle opening degree changes.

When the vehicle is in the transient-operation mode, the behavior of the peak hold value of the spectrum of the knock sensor signal is represented in (d) of FIG. 5. In this explanation, there is described an example in which when the filter coefficient is set in such a way as to be suited to the steady-operation mode, according to the calculation method explained by use of the foregoing equations (1) through (4), there are calculated the BGL and the knock determination threshold value for the peak hold value. In order to make the filter coefficient to be suited to the steady-operation mode, it is required to suppress the vibration of the peak hold value as much as possible when the BGL is calculated; thus, it is required to set the filter coefficient to be large (the cut-off frequency is set to be low), for example, in such a way that K1=K2=0.995.

However, in the case where a filter coefficient suitable for the steady-operation mode is utilized, a delay may occur in keeping track of the BGL in the transient-operation mode and hence a knock may erroneously be detected (indicated by "F" in (d) of FIG. 5). Accordingly, to date, measures therefor have been taken through a method in which in the transient-operation mode, the filter coefficients are switched (e.g., refer to Patent Document 5) or through a method in which the threshold value is corrected (e.g., refer to Patent Document 1); however, the present invention is characterized in that the filter coefficient can be corrected in accordance with the transient-operation mode.

Next, there will be explained the method in which in the engine control apparatus according to Embodiment 1 of the present invention, a transient correction coefficient is calculated in accordance with the transient-operation mode.

Figure 6A:
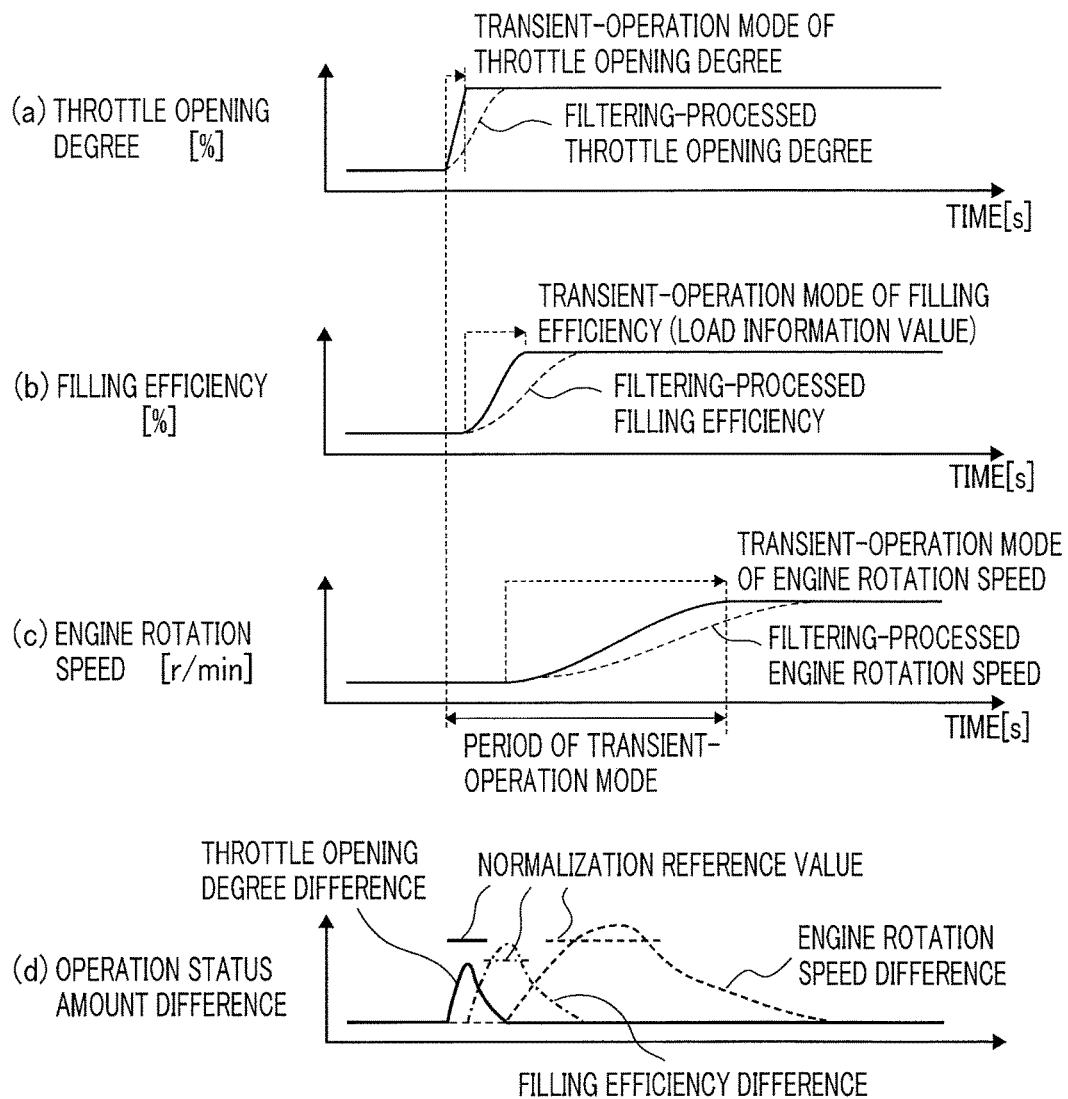
FIGS. 6A and 6B are timing charts schematically representing a method of calculating transient correction coefficients in an internal combustion engine control apparatus according to Embodiment 1 of the present invention.
Figure 6B:
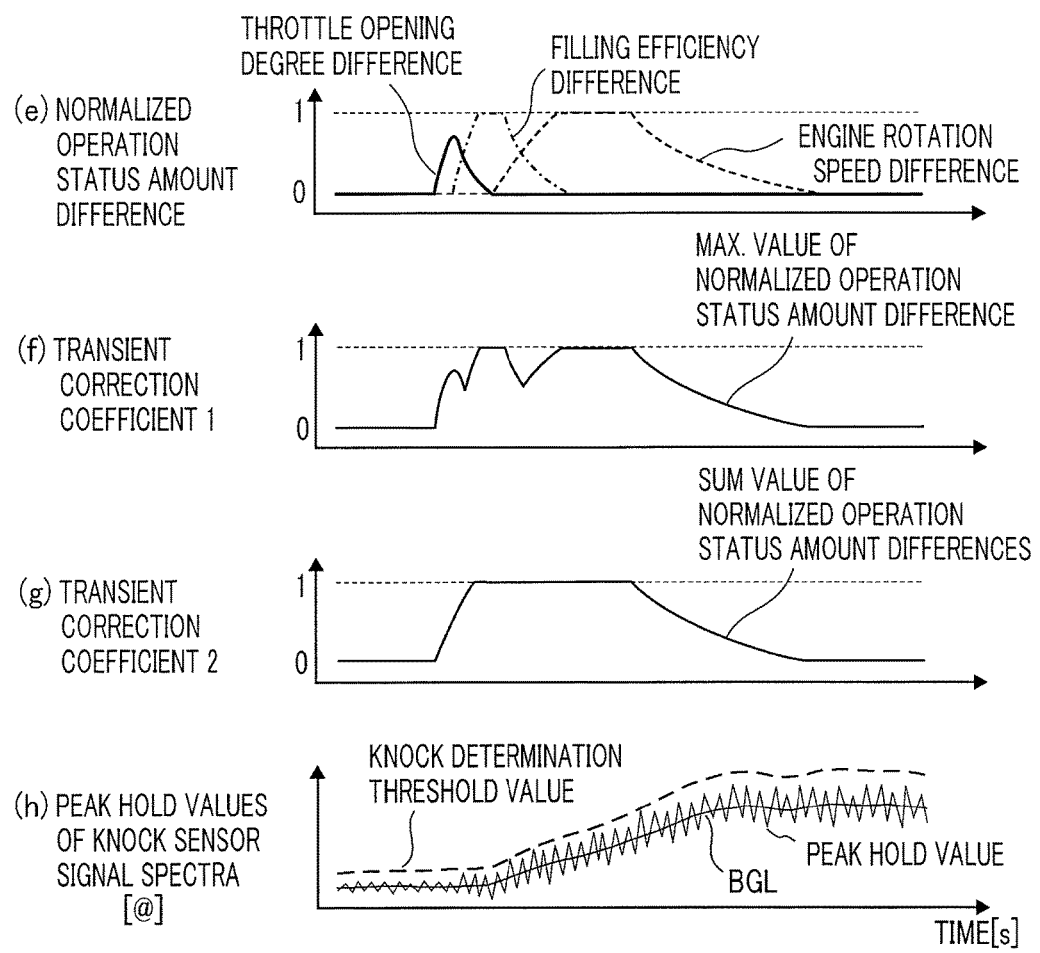

FIGS. 6A and 6B are timing charts schematically representing a method of calculating a transient correction coefficient in an internal combustion engine control apparatus according to Embodiment 1 of the present invention. The throttle opening degree (a), the filling efficiency (b), and the engine rotation speed (c) in FIG. 6A represent the same transient-operation mode as represented in (a) through (c) of FIG. 5; however, in (a) through (c) of FIG. 6A, filter-processed values are added to the respective operation status amounts.

The chart (d) in FIG. 6 represents the calculation value of the operation status amount difference between the filter-processed value and the non-filter-processed value of each of the operation status amounts. The operation status amount difference calculated in such a way as described above is proportional to the amount of change in the operation status amount; the engine control apparatus according to Embodiment 1 of the present invention is characterized in that the transient-operation mode is determined by use of the operation status amount difference.

In this regard, however, the operation status amount differences represented in (d) of FIG. 6 is values having the dimensions of the respective operation status amounts; therefore, in the case where the transient-operation mode is determined by use of a plurality of operation status amount differences, convenience is increased by normalizing the operation status amounts. Accordingly, for each operation status amount, a normalization reference value is preliminarily set, and by use of this normalization reference value, each operation status amount is normalized; furthermore, when the operation status amount that exceeds the normalization reference value is clipped, the normalized operation status amount difference is represented as in (e) of FIG. 6.

From the throttle opening degree difference, the filling efficiency difference, and the engine rotation speed difference which are the respective normalized operation status amount differences calculated in such a way as described above, there are calculated transient correction coefficients for interpolating the filtered values adequate to the steady-operation mode and the filtered values adequate to the transient-operation mode. As the method of calculating transient correction coefficients, there are conceivable, for example, a method in which as is the case with a transient correction coefficient 1 in (f) of FIG. 6, the maximum value of respective normalized operation status amount differences is calculated and a method in which as is the case with a transient correction coefficient 2 in (g) of FIG. 6, the total sum value of respective normalized operation status amount differences is calculated.

The chart (h) in FIG. 6 represents examples of BGL and knock determination threshold value that are calculated by utilizing the transient correction coefficient calculated, as described above, so as to interpolate the filtered values adequate to the steady-operation mode and the filtered values adequate to the transient-operation mode. As represented in (h) of FIG. 6, even when the vehicle is in the transient-operation mode, the BGL for the peak hold value can be traced; therefore, the knock determination threshold value can appropriately be calculated, whereby erroneous knock detection can be suppressed.

In the above explanation, the method of calculating a transient correction coefficient based on a throttle opening degree, a filling efficiency, and an engine rotation speed has been described; however, it may be allowed that instead of a throttle opening degree, an amount, controlled by another intake amount control device, such as a variable valve advanced angle or a variable valve lifting amount is utilized; furthermore, it may be allowed that instead of a filling efficiency, another load information value such as a volume efficiency, an intake pipe inner pressure, a cylinder intake air amount, or cylinder inner pressure is utilized.

Figure 7:
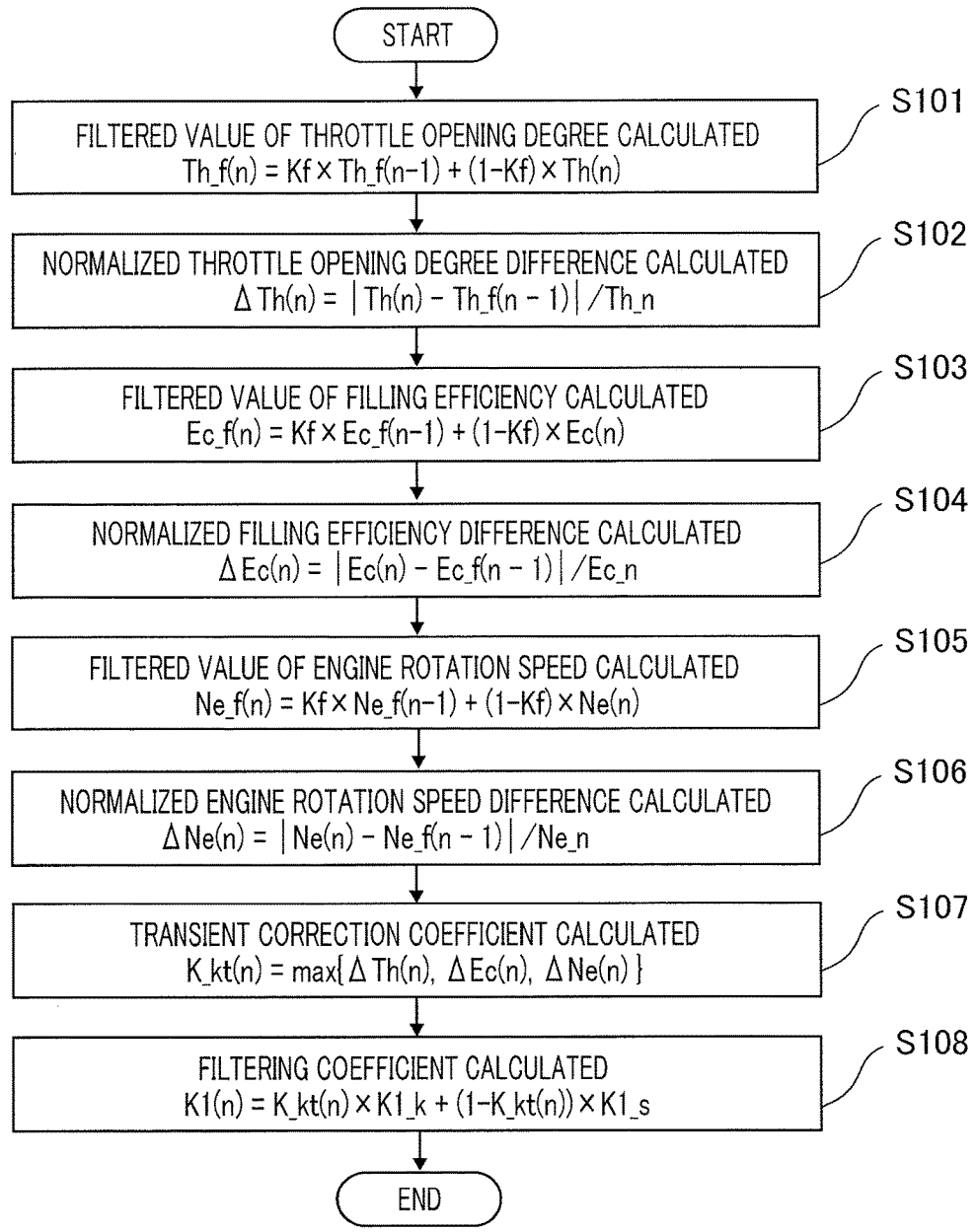
FIG. 7 is a flowchart representing a method of calculating a transient correction coefficient in an internal combustion engine control apparatus according to Embodiment 1 of the present invention.

Next, the method of calculating the foregoing transient correction coefficient adequate to the transient-operation mode will be explained more specifically. FIG. 7 is a flowchart representing a method of calculating a transient correction coefficient in an internal combustion engine control apparatus according to Embodiment 1 of the present invention. The flowchart in FIG. 7 is to specifically explain the calculations performed by the operation status value difference calculation unit 24, the operation status value difference normalization unit 25, and the transient correction coefficient calculation unit 26, which are illustrated in FIG. 3; this particular flowchart represents a case where as is the case in FIG. 6, a throttle opening degree, a filling efficiency, and an engine rotation speed are utilized, as the operation status values to be detected by the operation status value detection unit 23. The processing represented in FIG. 7 may be implemented through the main processing performed, for example, in a cycle of 10 [ms], or may be implemented through interruption processing that occurs in synchronization with the rotation of the engine 1.

In FIG. 7, in the step S101, filtering processing is applied to a throttle opening degree Th(n), so that a filter-processed throttle opening degree Th_f(n) is calculated. A filter coefficient Kf utilized here is preliminarily set (e.g., a value of approximately 0.975 is utilized) in such a way that a transient correction coefficient that is required to be calculated in a predetermined transient-operation mode is calculated.

In the step S102, the throttle opening degree difference between the filtered throttle opening degree and the non-filtered throttle opening degree is calculated, and then normalization based on a throttle opening degree normalization reference value Th_n is applied to the throttle opening degree difference, so that a normalized throttle opening degree difference ΔTh(n) is calculated. Here, (n) denotes the timing of the present processing; (n−1) denotes the timing of the immediately prior processing (in the main processing, it denotes processing that has been performed 10 [ms] ago, and in the rotation synchronization processing, it denotes processing that has been performed one stroke before).

In the step S103, filtering processing is applied to a filling efficiency Ec(n) so that a filtered filling efficiency Ec_f(n) is calculated; in the step S104, the filling efficiency difference between the filtered filling efficiency and the non-filtered filling efficiency is calculated, and then normalization based on a filling efficiency normalization reference value Ec_n is applied to the filling efficiency difference, so that a normalized filling efficiency difference ΔEc(n) is calculated. The step S103 forms a filtering processing unit of the present invention.

In the step S105, filtering processing is applied to an engine rotation speed Ne(n) so that a filtered engine rotation speed Ne_f(n) is calculated; in the step S106, the engine rotation speed difference between the filtered engine rotation speed and the non-filtered engine rotation speed is calculated, and then normalization based on an engine rotation speed normalization reference value Ne_n is applied to the engine rotation speed difference, so that a normalized engine rotation speed difference ΔNe(n) is calculated.

In the step S107, the transient correction coefficient K_kt(n) is calculated. In FIG. 7, there is represented a method (corresponding to (f) of FIG. 6) of calculating the respective maximum values of the normalized throttle opening degree difference ΔTh(n), the normalized filling efficiency difference ΔEc(n), the normalized engine rotation speed difference ΔNe(n); however, there may be utilized a method (corresponding to (g) of FIG. 6) of calculating the total sum value of these differences and clipping the total sum at a predetermined value (e.g., 1.0). In addition, there may be provided a dead band in such a way that the difference that is the same as or smaller than a predetermined value (e.g., 0.05) is regarded as "0".

In the step S108, by utilizing the transient correction coefficient K_kt(n) calculated in such a manner as described above, there is calculated the first filter coefficient K1(n), which is utilized in the equation (1). Here, a first filter coefficient K1_k is a filter coefficient adequate to the transient-operation mode in which the responsiveness is required most; K1_s is a filter coefficient adequate to the steady-operation mode. The second filter coefficient K2(n) that is utilized in the equation (2) can be calculated in a similar way.

In the internal combustion engine control apparatus according to Embodiment 1 of the present invention, as explained heretofore, there is detected the transient-operation mode by utilizing an intake amount control value, a loaded-mode value, and an engine rotation speed; therefore, the transient-operation mode can be detected without delay, whereby even when the vehicle is in the transient-operation mode, it can continuously be determined in which mode among the slow acceleration mode, the intermediate acceleration mode, and the rapid acceleration mode the present mode is. Because transient correction is implemented based on the determination value, a control amount adequate to the transient-operation mode can be calculated. Moreover, the steady-operation control amount and the transient-operation control amount are interpolated based on the transient correction coefficients calculated through the maximum value among a plurality of normalized operation status value differences or through the total sum value thereof; therefore, with few adequacy machine-hours, there can be calculated the transient-operation control amount that is adequate to the time period and the transient status of the transient-operation mode. By applying this method to knock control, the BGL and the standard deviation of the vibration levels of knock frequency components are calculated in accordance with the transient-operation mode; thus, even when the vehicle is in the transient-operation mode, the knock determination threshold value can appropriately be set, whereby erroneous retarding can be suppressed.

Embodiment 2

Next, there will be explained an internal combustion engine control apparatus according to Embodiment 2 of the present invention. An internal combustion engine control apparatus according to Embodiment 2 is approximately the same as the foregoing internal combustion engine control apparatus according to Embodiment 1; therefore, in the explanation below, there will be described only the portions different from those in Embodiment 1. In Embodiment 1, a transient correction coefficient is calculated and applied to the calculation, of a BGL and a knock determination threshold value in knock control, represented by the equations (1) through (4); however, in Embodiment 2, a transient correction coefficient is applied to the calculation, of the retarding amount and the advanced angle restoration speed in knock detection, represented by the equations (6) and (7).

Figure 8:
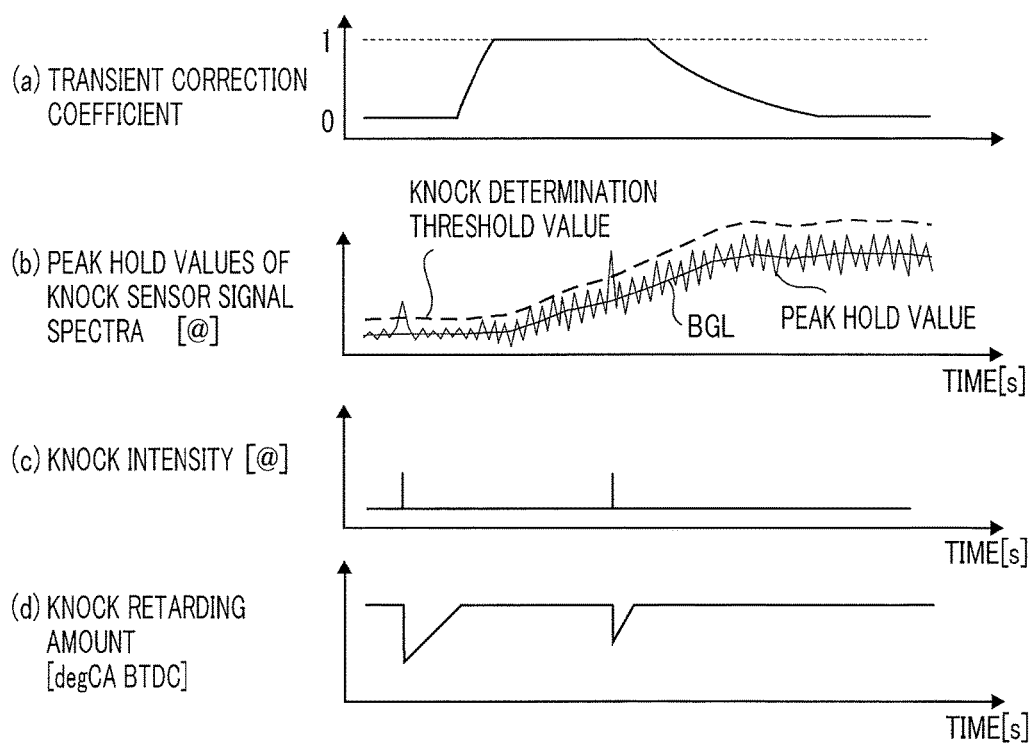
FIG. 8 is a timing chart schematically representing a method of calculating a transient correction coefficient in an internal combustion engine control apparatus according to Embodiment 2 of the present invention.

FIG. 8 is a timing chart schematically representing a method of calculating a transient correction coefficient in an internal combustion engine control apparatus according to Embodiment 2 of the present invention. In FIG. 8, the charts (a) and (b) represent the same transient correction coefficient in the transient-operation mode and the same peak hold values of the knock sensor signal spectra as those represented in (g) and (h), respectively; however, the chart (b) of FIG. 8 represents a state where a knock or large noise occurs in the steady-operation mode and the transient-operation mode.

The chart (c) of FIG. 8 represents a knock intensity calculated through the equation (5) when as described above, a knock or large noise occurs. In this explanation, for easier comparison, it is assumed that the respective knock intensities of knocks that occur in the steady-operation mode and the transient-operation mode are the same as each other. The chart (d) of FIG. 8 represents the knock retarding amount calculated through the equations (6) and (7); the reason why even though the knocks or large noise signals have the same level, there exist a difference in the retarding amount at a time when a knock occurs and a difference in the advanced angle speed at a time when no knock occurs is that the delayed angle reflected coefficient Kg and the advanced angle restoration coefficient Ka are corrected in accordance with the transient correction coefficient.

Figure 9:
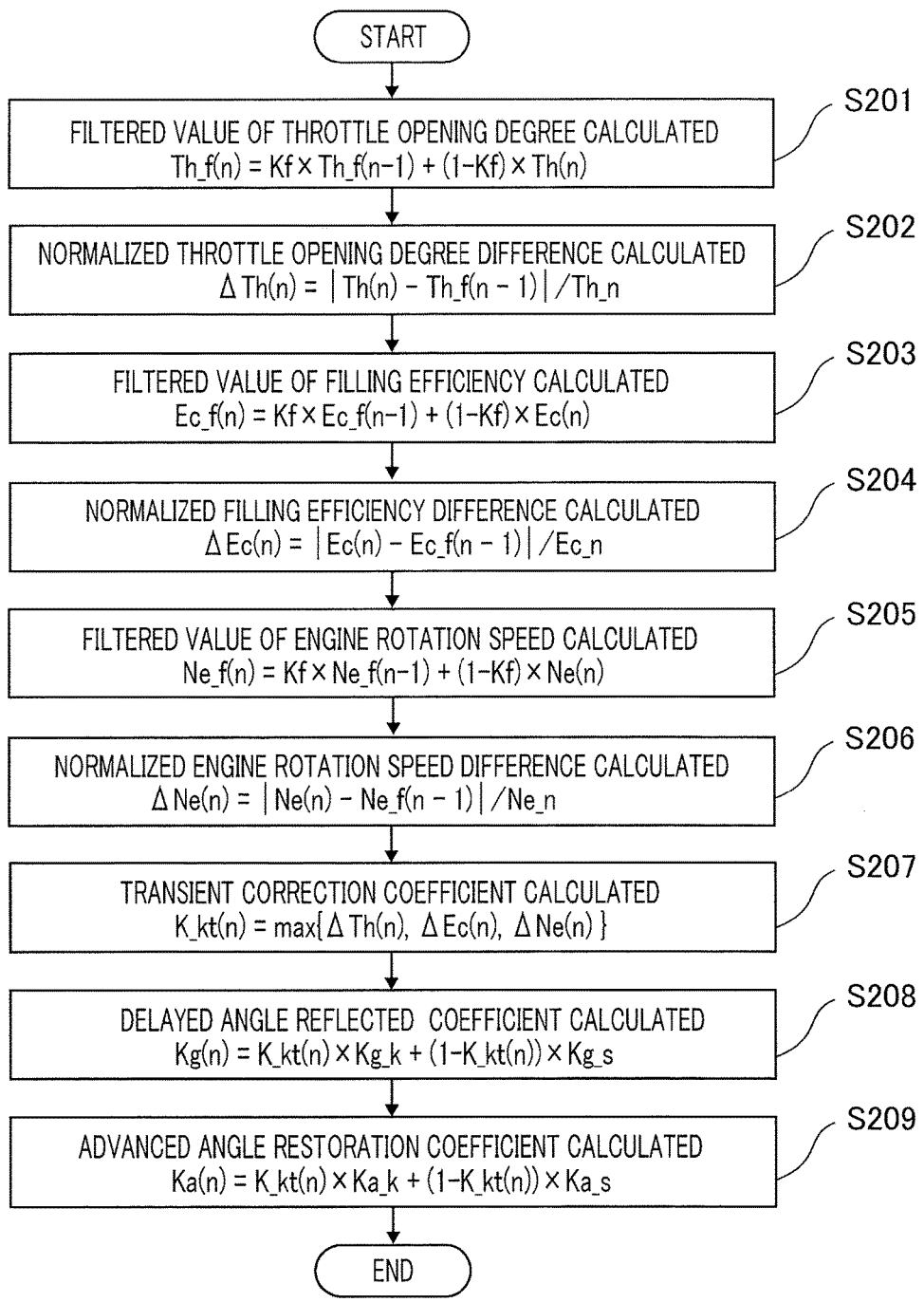
FIG. 9 is a flowchart representing a method of calculating a transient correction coefficient in an internal combustion engine control apparatus according to Embodiment 2 of the present invention.

Next, there will be explained a method, of calculating the knock retarding amount adequate to the transient-operation mode, according to Embodiment 2 of the present invention, which has been explained above. FIG. 9 is a flowchart representing a method of calculating a transient correction coefficient in an internal combustion engine control apparatus according to Embodiment 2 of the present invention. The processing represented by the flowchart in FIG. 9 may be implemented through the main processing performed, for example, in a cycle of 10 [ms], as is the same case with the processing represented in FIG. 7, or may be implemented through interruption processing that occurs in synchronization with the rotation of the engine.

In FIG. 9, the steps S201 through S207 are the same as the steps S101 through S107 in FIG. 7; therefore the explanation therefor will be omitted. In the step S208, by utilizing the transient correction coefficient K_kt(n), there is calculated the delayed angle reflected coefficient Kg(n), which is utilized in the equation (6). Here, Kg_k is a delayed angle reflected coefficient adequate to the transient-operation mode in which the responsiveness is required most; Kg_s is a delayed angle reflected coefficient adequate to the steady-operation mode.

Also in the step S209, by utilizing the transient correction coefficient K_kt(n), there is calculated the advanced angle restoration coefficient Ka(n), which is utilized in the equation (7). Here, Ka_k is an advanced angle restoration coefficient adequate to the transient-operation mode in which the responsiveness is required most; Ka_s is an advanced angle restoration coefficient adequate to the steady-operation mode.

As explained above, in the internal combustion engine control apparatus according to Embodiment 2 of the present invention, a knock intensity in knock control and a knock-retarding-amount transformation coefficient adequate to the transient-operation mode are calculated in accordance with the transient correction coefficient (for example, the knock retarding amount in the transient-operation mode is set smaller than that in the steady-operation mode); therefore, even in the case where a knock is caused when a vehicle is in the transient-operation mode, a critical mass of retarding is implemented, and even when being erroneous, this retarding is suppressed as much as possible from decreasing the output. Additionally, a knock-retarding-amount advanced angle restoration speed at a time when no knock is detected is calculated in such a way as to conform to the transient-operation mode (for example, the advanced angle restoration speed in the transient-operation mode is set to be faster than that in the steady-operation mode); therefore, even in the case where a knock is caused when a vehicle is in the transient-operation mode, the output can be suppressed as much as possible from decreasing, and even when being erroneous, this retarding is suppressed as much as possible from decreasing the output.

Heretofore, there have been explained in detail Embodiments 1 and 2 in each of which an internal combustion engine control apparatus according to the present invention is reduced to practice; internal combustion engine control apparatuses according to the present invention have the following features.

(1) An internal combustion engine control apparatus according to the present invention is characterized by including an operation status value detection unit that detects two or more operation status values indicating an operation status of an internal combustion engine; a filtering processing unit that applies filtering processing to the detected two or more operation status values; an operation status value difference calculation unit that calculates the difference between the filter-processed operation status value and the corresponding non-filter-processed operation status value so as to calculate two or more operation status value differences; an operation status value difference normalization unit that normalizes the two or more operation status value differences, based on predetermined reference values for the two or more operation status values, so as to calculate two or more normalized operation status value differences; and a transient correction unit that corrects a control amount for controlling output of the internal combustion engine, based on the two or more normalized operation status value differences, when the internal combustion engine is in a transient-operation mode.

This configuration makes it possible that by utilizing two or more operation status values, a transient-operation mode can be detected without delay, whereby there can be demonstrated an excellent effect that transient correction amounts including an acceleration/deceleration degree, a transient correction period, a transient correction amount reducing speed, and the like can be made adequate with few machine-hours.

(2) An internal combustion engine control apparatus according to the present invention is characterized in that the operation status values detected by the operation status detection unit include at least one of an intake amount control value of the internal combustion engine, a load information value of the internal combustion engine, and a rotation speed of the internal combustion engine.

In this configuration, a transient-operation mode is detected by use of the intake amount control value, the load information value, and the rotation speed; therefore, the transient-operation mode can be detected without delay.

(3) An internal combustion engine control apparatus according to the present invention is characterized in that the transient correction unit calculates the maximum value of the calculated two or more normalized operation status value differences and interpolates a steady-operation control amount and a transient-operation control amount for the internal combustion engine, based on the calculated maximum value.

In this configuration, a steady-operation control amount and a transient-operation control amount are interpolated based on the maximum value of two or more normalized operation status value differences; therefore, with few adequacy machine-hours, there can be calculated the transient-operation control amount that is adequate to the'time period and the transient status of the transient-operation mode.

(4) An internal combustion engine control apparatus according to the present invention is characterized in that the transient correction unit calculates the total sum value of the calculated two or more normalized operation status value differences and interpolates a steady-operation control amount and a transient-operation control amount for the internal combustion engine, based on the calculated total sum value.

In this configuration, a steady-operation control amount and a transient-operation control amount are interpolated based on the total sum value of two or more normalized operation status value differences; therefore, with few adequacy machine-hours, there can be calculated the transient-operation control amount that is adequate to the time period and the transient status of the transient-operation mode.

(5) An internal combustion engine control apparatus according to the present invention includes a knock sensor that detects a vibration of an internal combustion engine; a knock frequency extraction unit that extracts, from the output of the knock sensor, knock frequency components based on a knock that is caused in the internal combustion engine; an averaging unit that applies filtering processing to vibration levels of the extracted knock frequency components and calculates a background level corresponding to the average value of the vibration levels; a standard deviation calculation unit that applies filtering processing to differences between vibration levels of the extracted knock frequency components and the background level so as to calculate a standard deviation; a threshold value calculation unit that calculates a knock determination threshold value, based on the calculated background level and the standard deviation; a knock detection unit that detects the knock, based on the vibration levels of the extracted knock frequency components and the calculated knock determination threshold value; and a knock control unit that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected. The internal combustion engine control apparatus is characterized in that the transient correction unit corrects, as correction of the control amount, a filter coefficient utilized in at least one of the filtering processing in the averaging unit and the filtering processing in the standard deviation calculation unit. In this configuration, the BGL and the standard deviation of the vibration levels of knock frequency components in knock control are calculated in accordance with a transient-operation mode; thus, even in the case of a transient-operation mode, the knock determination threshold value can appropriately be set, whereby erroneous retarding can be suppressed.

(6) An internal combustion engine control apparatus according to the present invention includes a knock sensor that detects a vibration of an internal combustion engine; a knock frequency extraction unit that extracts, from the output of the knock sensor, knock frequency components based on a knock that is caused in the internal combustion engine; an averaging unit that applies filtering processing to vibration levels of the extracted knock frequency components and calculates a background level corresponding to the average value of the vibration levels; a standard deviation calculation unit that applies filtering processing to differences between vibration levels of the extracted knock frequency components and the background level so as to calculate a standard deviation; a threshold value calculation unit that calculates a knock determination threshold value, based on the calculated background level and the standard deviation; a knock detection unit that detects the knock, based on the vibration levels of the extracted knock frequency components and the calculated knock determination threshold value; and a knock control unit that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected. The internal combustion engine control apparatus is characterized in that the transient correction unit corrects, as correction of the control amount, a knock intensity utilized for calculation of a knock correction amount for retarding the timing of ignition by the knock control unit and a transformation coefficient for the knock correction amount.

In this configuration, the knock intensity in knock control and the transformation coefficient for a knock retarding amount are calculated in such a way as to conform to the transient-operation mode (for example, the knock retarding amount in the transient-operation mode is set to be smaller than that in the steady-operation mode); therefore, even when erroneous retarding is caused, this erroneous retarding is suppressed from decreasing the output.

(7) An internal combustion engine control apparatus according to the present invention includes a knock sensor that detects a vibration of an internal combustion engine; a knock frequency extraction unit that extracts, from the output of the knock sensor, knock frequency components based on a knock that is caused in the internal combustion engine; an averaging unit that applies filtering processing to vibration levels of the extracted knock frequency components and calculates a background level corresponding to the average value of the vibration levels; a standard deviation calculation unit that applies filtering processing to differences between vibration levels of the extracted knock frequency components and the background level so as to calculate a standard deviation; a threshold value calculation unit that calculates a knock determination threshold value, based on the calculated background level and the standard deviation; a knock detection unit that detects the knock, based on the vibration levels of the extracted knock frequency components and the calculated knock determination threshold value; and a knock control unit that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected. The internal combustion engine control apparatus is characterized in that the transient correction unit corrects, as correction of the control amount, an advanced angle restoration speed for restoring a knock correction amount in an angle advancing manner at the time when no knock is detected. In this configuration, a knock-retarding-amount advanced angle restoration speed at a time when no knock is detected is calculated in such a way as to conform to the transient-operation mode (for example, the advanced angle restoration speed in the transient-operation mode is set to be faster than that in the steady-operation mode); therefore, even when erroneous retarding is caused, this erroneous retarding is suppressed from decreasing the output.

Various modifications and alterations of this invention will be apparent to those skilled in the art without departing from the scope and spirit of this invention, and it should be understood that this is not limited to the illustrative embodiments set forth herein.

What is claimed is:

1. An internal combustion engine control apparatus for controlling output of an internal combustion engine, comprising:
an operation status value detection unit that detects two or more different kinds of operation status values indicating an operation status of the internal combustion engine;
a filtering processing unit that applies filtering processing to the detected two or more different kinds of operation status values;
an operation status value difference calculation unit that calculates the difference between the filter-processed operation status value and the corresponding non-filter-processed operation status value so as to calculate two or more operation status value differences;
an operation status value difference normalization unit that normalizes the two or more operation status value differences, based on predetermined reference values for the two or more different kinds of operation status values, so as to calculate two or more normalized operation status value differences; and
a transient correction unit that corrects a control amount for controlling output of the internal combustion engine, based on the two or more normalized operation status value differences, when the internal combustion engine is in a transient-operation mode.

2. The internal combustion engine control apparatus according to claim 1, wherein the operation status values detected by the operation status detection unit include at least one of an intake amount control value of the internal combustion engine, a load information value of the internal combustion engine, and a rotation speed of the internal combustion engine.

3. The internal combustion engine control apparatus according to claim 2, wherein the transient correction unit calculates the maximum value of the calculated two or more normalized operation status value differences and interpolates a steady-operation control amount and a transient-operation control amount for the internal combustion engine, based on the calculated maximum value.

4. The internal combustion engine control apparatus according to claim 3, further including:
 a knock sensor that detects a vibration of an internal combustion engine;
 a knock frequency extractor that extracts, from the output of the knock sensor, knock frequency components based on a knock that is caused in the internal combustion engine;
 an averaging processor that applies filtering processing to vibration levels of the extracted knock frequency components and calculates a background level corresponding to the average value of the vibration levels;
 a standard deviation calculation unit that applies filtering processing to differences between vibration levels of the extracted knock frequency components and the background level so as to calculate a standard deviation;
 a threshold value calculation unit that calculates a knock determination threshold value, based on the calculated background level and the standard deviation;
 a knock detection unit that detects the knock, based on the vibration levels of the extracted knock frequency components and the calculated knock determination threshold value; and
 a knock controller that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected,
 wherein the transient correction unit corrects, as correction of the control amount, a filter coefficient utilized in at least one of the filtering processing in the averaging processor and the filtering processing in the standard deviation calculation unit.

5. The internal combustion engine control apparatus according to claim 3, further including:
 a knock sensor that detects a vibration of an internal combustion engine;
 a knock frequency extractor that extracts, from the output of the knock sensor, knock frequency components based on a knock that is caused in the internal combustion engine;
 an averaging processor that applies filtering processing to vibration levels of the extracted knock frequency components and calculates a background level corresponding to the average value of the vibration levels;
 a standard deviation calculation unit that applies filtering processing to differences between vibration levels of the extracted knock frequency components and the background level so as to calculate a standard deviation;
 a threshold value calculation unit that calculates a knock determination threshold value, based on the calculated background level and the standard deviation;
 a knock detection unit that detects the knock, based on the vibration levels of the extracted knock frequency components and the calculated knock determination threshold value; and
 a knock controller that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected,
 wherein the transient correction unit corrects, as correction of the control amount, a knock intensity utilized for calculation of a knock correction amount for retarding the timing of ignition by the knock controller and a transformation coefficient for the knock correction amount.

6. The internal combustion engine control apparatus according to claim 3, further including:
 a knock sensor that detects a vibration of an internal combustion engine;
 a knock frequency extractor that extracts, from the output of the knock sensor, knock frequency components based on a knock that is caused in the internal combustion engine;
 an averaging processor that applies filtering processing to vibration levels of the extracted knock frequency components and calculates a background level corresponding to the average value of the vibration levels;
 a standard deviation calculation unit that applies filtering processing to differences between vibration levels of the extracted knock frequency components and the background level so as to calculate a standard deviation;
 a threshold value calculation unit that calculates a knock determination threshold value, based on the calculated background level and the standard deviation;
 a knock detection unit that detects the knock, based on the vibration levels of the extracted knock frequency components and the calculated knock determination threshold value; and
 a knock controller that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected,
 wherein the transient correction unit corrects, as correction of the control amount, an advanced angle restoration speed for restoring a knock correction amount in an angle advancing manner at the time when no knock is detected.

7. The internal combustion engine control apparatus according to claim 2, wherein the transient correction unit calculates the total sum value of the calculated two or more normalized operation status value differences and interpolates a steady-operation control amount and a transient-operation control amount for the internal combustion engine, based on the calculated total sum value.

8. The internal combustion engine control apparatus according to claim 7, further including:
   a knock sensor that detects a vibration of an internal combustion engine;
   a knock frequency extractor that extracts, from the output of the knock sensor, knock frequency components based on a knock that is caused in the internal combustion engine;
   an averaging processor that applies filtering processing to vibration levels of the extracted knock frequency components and calculates a background level corresponding to the average value of the vibration levels;
   a standard deviation calculation unit that applies filtering processing to differences between vibration levels of the extracted knock frequency components and the background level so as to calculate a standard deviation;
   a threshold value calculation unit that calculates a knock determination threshold value, based on the calculated background level and the standard deviation;
   a knock detection unit that detects the knock, based on the vibration levels of the extracted knock frequency components and the calculated knock determination threshold value; and
   a knock controller that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected,
   wherein the transient correction unit corrects, as correction of the control amount, a filter coefficient utilized in at least one of the filtering processing in the averaging processor and the filtering processing in the standard deviation calculation unit.

9. The internal combustion engine control apparatus according to claim 7, further including:
   a knock sensor that detects a vibration of an internal combustion engine;
   a knock frequency extractor that extracts, from the output of the knock sensor, knock frequency components based on a knock that is caused in the internal combustion engine;
   an averaging processor that applies filtering processing to vibration levels of the extracted knock frequency components and calculates a background level corresponding to the average value of the vibration levels;
   a standard deviation calculation unit that applies filtering processing to differences between vibration levels of the extracted knock frequency components and the background level so as to calculate a standard deviation;
   a threshold value calculation unit that calculates a knock determination threshold value, based on the calculated background level and the standard deviation;
   a knock detection unit that detects the knock, based on the vibration levels of the extracted knock frequency components and the calculated knock determination threshold value; and
   a knock controller that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected,
   wherein the transient correction unit corrects, as correction of the control amount, a knock intensity utilized for calculation of a knock correction amount for retarding the timing of ignition by the knock controller and a transformation coefficient for the knock correction amount.

10. The internal combustion engine control apparatus according to claim 7, further including:
    a knock sensor that detects a vibration of an internal combustion engine;
    a knock frequency extractor that extracts, from the output of the knock sensor, knock frequency components based on a knock that is caused in the internal combustion engine;
    an averaging processor that applies filtering processing to vibration levels of the extracted knock frequency components and calculates a background level corresponding to the average value of the vibration levels;
    a standard deviation calculation unit that applies filtering processing to differences between vibration levels of the extracted knock frequency components and the background level so as to calculate a standard deviation;
    a threshold value calculation unit that calculates a knock determination threshold value, based on the calculated background level and the standard deviation;
    a knock detection unit that detects the knock, based on the vibration levels of the extracted knock frequency components and the calculated knock determination threshold value; and
    a knock controller that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected,
    wherein the transient correction unit corrects, as correction of the control amount, an advanced angle restoration speed for restoring a knock correction amount in an angle advancing manner at the time when no knock is detected.

11. The internal combustion engine control apparatus according to claim 2, further including:
    a knock sensor that detects a vibration of an internal combustion engine;
    a knock frequency extractor that extracts, from the output of the knock sensor, knock frequency components based on a knock that is caused in the internal combustion engine;
    an averaging processor that applies filtering processing to vibration levels of the extracted knock frequency components and calculates a background level corresponding to the average value of the vibration levels;
    a standard deviation calculation unit that applies filtering processing to differences between vibration levels of the extracted knock frequency components and the background level so as to calculate a standard deviation;
a threshold value calculation unit that calculates a knock determination threshold value, based on the calculated background level and the standard deviation;
a knock detection unit that detects the knock, based on the vibration levels of the extracted knock frequency components and the calculated knock determination threshold value; and
a knock controller that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected,
wherein the transient correction unit corrects, as correction of the control amount, a filter coefficient utilized in at least one of the filtering processing in the averaging processor and the filtering processing in the standard deviation calculation unit.

12. The internal combustion engine control apparatus according to claim 2, further including:
a knock sensor that detects a vibration of an internal combustion engine;
a knock frequency extractor that extracts, from the output of the knock sensor, knock frequency components based on a knock that is caused in the internal combustion engine;
an averaging processor that applies filtering processing to vibration levels of the extracted knock frequency components and calculates a background level corresponding to the average value of the vibration levels;
a standard deviation calculation unit that applies filtering processing to differences between vibration levels of the extracted knock frequency components and the background level so as to calculate a standard deviation;
a threshold value calculation unit that calculates a knock determination threshold value, based on the calculated background level and the standard deviation;
a knock detection unit that detects the knock, based on the vibration levels of the extracted knock frequency components and the calculated knock determination threshold value; and
a knock controller that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected,
wherein the transient correction unit corrects, as correction of the control amount, a knock intensity utilized for calculation of a knock correction amount for retarding the timing of ignition by the knock controller and a transformation coefficient for the knock correction amount.

13. The internal combustion engine control apparatus according to claim 2, further including:
a knock sensor that detects a vibration of an internal combustion engine;
a knock frequency extractor that extracts, from the output of the knock sensor, knock frequency components based on a knock that is caused in the internal combustion engine;
an averaging processor that applies filtering processing to vibration levels of the extracted knock frequency components and calculates a background level corresponding to the average value of the vibration levels;
a standard deviation calculation unit that applies filtering processing to differences between vibration levels of the extracted knock frequency components and the background level so as to calculate a standard deviation;
a threshold value calculation unit that calculates a knock determination threshold value, based on the calculated background level and the standard deviation;
a knock detection unit that detects the knock, based on the vibration levels of the extracted knock frequency components and the calculated knock determination threshold value; and
a knock controller that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected,
wherein the transient correction unit corrects, as correction of the control amount, an advanced angle restoration speed for restoring a knock correction amount in an angle advancing manner at the time when no knock is detected.

14. The internal combustion engine control apparatus according to claim 1, wherein the transient correction unit calculates the maximum value of the calculated two or more normalized operation status value differences and interpolates a steady-operation control amount and a transient-operation control amount for the internal combustion engine, based on the calculated maximum value.

15. The internal combustion engine control apparatus according to claim 14, further including:
a knock sensor that detects a vibration of an internal combustion engine;
a knock frequency extractor that extracts, from the output of the knock sensor, knock frequency components based on a knock that is caused in the internal combustion engine;
an averaging processor that applies filtering processing to vibration levels of the extracted knock frequency components and calculates a background level corresponding to the average value of the vibration levels;
a standard deviation calculation unit that applies filtering processing to differences between vibration levels of the extracted knock frequency components and the background level so as to calculate a standard deviation;
a threshold value calculation unit that calculates a knock determination threshold value, based on the calculated background level and the standard deviation;
a knock detection unit that detects the knock, based on the vibration levels of the extracted knock frequency components and the calculated knock determination threshold value; and
a knock controller that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected, wherein the transient correction unit corrects, as correction of the control amount, a filter coefficient utilized in at least one of the filtering processing in the averaging processor and the filtering processing in the standard deviation calculation unit.

16. The internal combustion engine control apparatus according to claim 14, further including:
  a knock sensor that detects a vibration of an internal combustion engine;
  a knock frequency extractor that extracts, from the output of the knock sensor, knock frequency components based on a knock that is caused in the internal combustion engine;
  an averaging processor that applies filtering processing to vibration levels of the extracted knock frequency components and calculates a background level corresponding to the average value of the vibration levels;
  a standard deviation calculation unit that applies filtering processing to differences between vibration levels of the extracted knock frequency components and the background level so as to calculate a standard deviation;
  a threshold value calculation unit that calculates a knock determination threshold value, based on the calculated background level and the standard deviation;
  a knock detection unit that detects the knock, based on the vibration levels of the extracted knock frequency components and the calculated knock determination threshold value; and
  a knock controller that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected, wherein the transient correction unit corrects, as correction of the control amount, a knock intensity utilized for calculation of a knock correction amount for retarding the timing of ignition by the knock controller and a transformation coefficient for the knock correction amount.

17. The internal combustion engine control apparatus according to claim 1, wherein the transient correction unit calculates the total sum value of the calculated two or more normalized operation status value differences and interpolates a steady-operation control amount and a transient-operation control amount for the internal combustion engine, based on the calculated total sum value.

18. The internal combustion engine control apparatus according to claim 1, further including:
  a knock sensor that detects a vibration of an internal combustion engine;
  a knock frequency extractor that extracts, from the output of the knock sensor, knock frequency components based on a knock that is caused in the internal combustion engine;
  an averaging processor that applies filtering processing to vibration levels of the extracted knock frequency components and calculates a background level corresponding to the average value of the vibration levels;
  a standard deviation calculation unit that applies filtering processing to differences between vibration levels of the extracted knock frequency components and the background level so as to calculate a standard deviation;
  a threshold value calculation unit that calculates a knock determination threshold value, based on the calculated background level and the standard deviation;
  a knock detection unit that detects the knock, based on the vibration levels of the extracted knock frequency components and the calculated knock determination threshold value; and
  a knock controller that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected, wherein the transient correction unit corrects, as correction of the control amount, a filter coefficient utilized in at least one of the filtering processing in the averaging processor and the filtering processing in the standard deviation calculation unit.

19. The internal combustion engine control apparatus according to claim 1, further including:
  a knock sensor that detects a vibration of an internal combustion engine;
  a knock frequency extractor that extracts, from the output of the knock sensor, knock frequency components based on a knock that is caused in the internal combustion engine;
  an averaging processor that applies filtering processing to vibration levels of the extracted knock frequency components and calculates a background level corresponding to the average value of the vibration levels;
  a standard deviation calculation unit that applies filtering processing to differences between vibration levels of the extracted knock frequency components and the background level so as to calculate a standard deviation;
  a threshold value calculation unit that calculates a knock determination threshold value, based on the calculated background level and the standard deviation;
  a knock detection unit that detects the knock, based on the vibration levels of the extracted knock frequency components and the calculated knock determination threshold value; and
  a knock controller that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected, wherein the transient correction unit corrects, as correction of the control amount, a knock intensity utilized for calculation of a knock correction amount for retarding the timing of ignition by the knock controller and a transformation coefficient for the knock correction amount.

20. The internal combustion engine control apparatus according to claim 1, further including:
   a knock sensor that detects a vibration of an internal combustion engine;
   a knock frequency extractor that extracts, from the output of the knock sensor, knock frequency components based on a knock that is caused in the internal combustion engine;
   an averaging processor that applies filtering processing to vibration levels of the extracted knock frequency components and calculates a background level corresponding to the average value of the vibration levels;
   a standard deviation calculation unit that applies filtering processing to differences between vibration levels of the extracted knock frequency components and the background level so as to calculate a standard deviation;
   a threshold value calculator that calculates a knock determination threshold value, based on the calculated background level and the standard deviation;
   a knock detection unit that detects the knock, based on the vibration levels of the extracted knock frequency components and the calculated knock determination threshold value; and
   a knock controller that calculates, when the knock is detected, the intensity of the caused knock, based on the background level, the vibration levels of the knock frequency components, and the knock determination threshold value, and calculates a knock correction amount for retarding the ignition timing of the internal combustion engine, based on the calculated knock intensity, and restores the knock correction amount in an angle advancing manner, when no knock is detected, wherein the transient correction unit corrects, as correction of the control amount, an advanced angle restoration speed for restoring a knock correction amount in an angle advancing manner at the time when no knock is detected.

* * * * *